United States Patent [19]

Asayama

[11] Patent Number: 5,214,408
[45] Date of Patent: May 25, 1993

[54] DISTANCE DETECTING APPARATUS FOR A VEHICLE

[75] Inventor: Yoshiaki Asayama, Himeji, Japan

[73] Assignee: Mitsubishi Denki Kabushiki Kaisha, Tokyo, Japan

[21] Appl. No.: 782,110

[22] Filed: Oct. 24, 1991

[30] Foreign Application Priority Data

Oct. 25, 1990 [JP] Japan .................. 2-290469
Nov. 28, 1990 [JP] Japan .................. 2-335430

[51] Int. Cl.$^5$ .................... B60Q 1/00; G08G 1/16
[52] U.S. Cl. ........................ 340/435; 340/436;
  340/901; 340/903; 340/939; 340/555; 340/942;
  358/105; 358/125; 180/169; 180/167; 342/55;
  342/66; 342/69
[58] Field of Search ........... 340/435, 903, 937, 901,
  340/436, 555, 556, 937, 961; 358/107-113, 125;
  180/167-169, 271; 342/47, 55, 66, 126, 118, 69,
  450, 451

[56] References Cited

U.S. PATENT DOCUMENTS

| | | | |
|---|---|---|---|
| 4,539,590 | 9/1985 | Gage | 358/107 |
| 4,709,264 | 11/1987 | Tamura et al. | 358/93 |
| 4,779,095 | 10/1988 | Guerreri | 340/904 |
| 4,908,704 | 3/1990 | Fujioka et al. | 358/108 |
| 5,026,153 | 6/1991 | Suzuki et al. | 340/903 |

FOREIGN PATENT DOCUMENTS

55-15337 4/1980 Japan .
57-49841 10/1982 Japan .
63-18122 4/1988 Japan .
63-38085 7/1988 Japan .
63-64363 12/1988 Japan .
1-12221 4/1989 Japan .

*Primary Examiner*—Donnie L. Crosland
*Attorney, Agent, or Firm*—Sughrue, Mion, Zinn, Macpeak and Seas

[57] ABSTRACT

A distance detecting apparatus enables the driver of a vehicle to readily and concurrently recognize the location and direction of each of a plurality of objects present in the driver's field of view, in daylight or darkness, and at the same time determine whether each of the objects is an obstacle to the vehicle travel. The objects sensed by a pair of first and second image sensors 3, 4 are displayed on a screen 11 in a plurality of windows 15–19. Deviations between the images of the objects within the respective windows are electrically detected so that the distance to an object within each window is individually calculated based on the deviations. Obstacles to the travel of the vehicle can be discriminated on the basis of the positions of the windows on the screen and the distances to the objects in the respective windows as detected. Infrared light can be projected onto objects present within the fields of view of the image sensors when natural visible light is insufficient for the image sensors which, in this case, are sensitive to infrared light.

8 Claims, 6 Drawing Sheets

IMAGES IN MEMORY 9

FIG. 4(b)

IMAGES IN MEMORY 8

DISTANCE DETECTING APPARATUS FOR A VEHICLE

BACKGROUND OF THE INVENTION

The present invention relates to an apparatus for optically measuring the distance from a vehicle to objects such as obstacles lying ahead thereof as well as other vehicles which are travelling ahead of the vehicle or approaching it from behind.

Some examples of an obstacle detecting apparatus are disclosed in Japanese Patent Laid-Open 55-15337 and Japanese Utility Model Laid-Open 1-12221. These apparatuses project ultrasonic waves or electromagnetic waves in a specified forward or backward direction to be detected and receive reflected waves from an object or obstacle for the purpose of determining the presence or absence of an obstacle as well as measuring the distance thereto.

Figure 8:
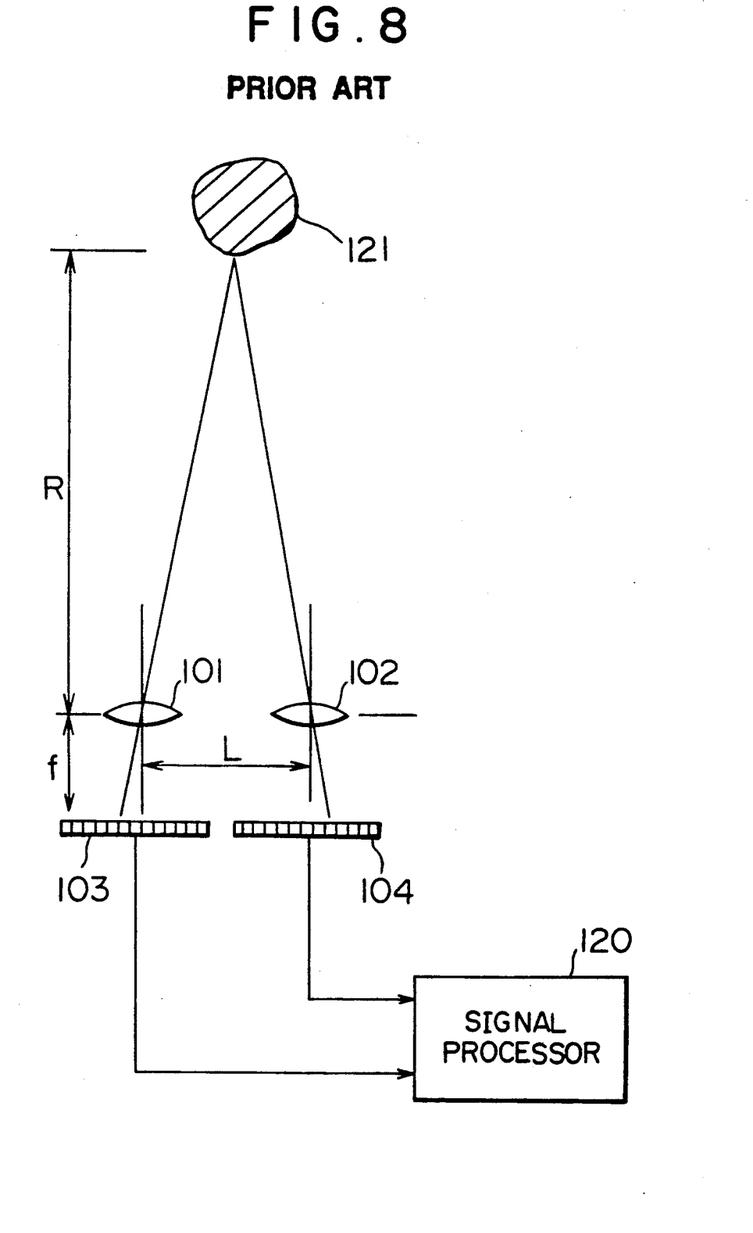
FIG. 8 is a block diagram showing the general arrangement of a conventional distance detecting apparatus for a vehicle.

Examples of an optical distance detecting apparatus utilizing image sensors are known from Japanese Patent Publication Nos. 63-38085 and 63-46363. As illustrated in FIG. 8, the apparatuses disclosed therein commonly have a pair of first and second parallel optical systems having two convex lenses 101, 102 disposed in a horizontally aligned relation at a prescribed distance L away from each other. A pair of separate image sensors 103, 104 are horizontally disposed at focal points of the lenses 101, 102 at a distance f from the locations of corresponding lenses 101, 102, respectively, for generating respective image signals to a common signal processor 120. The signal processor 120 successively shifts the image signals from the image sensors 103, 104 and electrically superposes them one over the other, so that the distance R from the lenses 101, 102 to an object 121 is calculated based on the principle of triangulation using the following formula:

$$R = (f \times L)/d$$

where d is a shift distance by which the image signals are moved to obtain the best match.

In addition, Japanese Patent Publication No. 63-18122 discloses an obstacle detecting apparatus for a vehicle which is provided with a plurality of light emitting elements or light transmitters each projecting a beam of light toward objects to be detected for the purpose of improving the contrast of the image of an object sensed by the image sensors in the event that no good image contrast is obtained.

With the distance and/or obstacle detecting apparatuses as described above, it is possible to detect the presence or absence of an object lying in the direction in which ultrasonic or electromagnetic waves or light are projected, but it is difficult to precisely determine whether the object thus detected is an obstacle to the travel of the vehicle. For example, when a vehicle is travelling on a curved road, the obstacle detecting apparatus mounted thereon can misidentify a guide rail, which is set up along one side or shoulder of the curved road and lies ahead of the cornering vehicle, as an obstacle. In addition, in order to exactly determine the location and direction of the object detected with respect to the moving vehicle, many ultrasonic or electromagnetic wave transmitters and receivers are required, thus resulting in a great increase in size and costs of manufacture of the overall apparatus.

Moreover, if there are many objects within the field of view of the image sensors, it is unclear to which object the distance from the subject vehicle is being detected. In particular, let us assume that the distance to an object in the form of a preceding vehicle is detected by the above-described distance detecting apparatus mounted on the subject vehicle during the travel thereof. In this case, if another vehicle travelling on one of plural lanes of a road adjacent the one on which the subject vehicle is travelling comes into the field of view of the image sensors, it is not clear at all or the driver cannot tell to which vehicle (i.e., travelling on the same lane or on an adjacent lane) the distance is detected.

Furthermore, in cases where the brightness or magnitude of external light is insufficient for proper distance detection by image sensors such as when the vehicle travels in a tunnel or in dark weather such as in the evening, twilight, etc., it is necessary to use a light emitting element which projects a beam of visible light toward a preceding vehicle. In this case, however, there is a fear that the passengers including the driver in the preceding vehicle are dazzled by the light from the light emitting element, making it difficult for the driver to properly maneuver his or her vehicle in a safe manner.

SUMMARY OF THE INVENTION

Accordingly, the present invention is intended to overcome the above-mentioned problems encountered with the conventional apparatuses.

An object of the invention is to provide a novel and improved distance detecting apparatus for a vehicle in which the driver is able to readily and exactly recognize the location and direction of each object present within the wide field of view of the driver, and at the same time determine whether each of the objects is an obstacle to the travel of his or her vehicle as well.

Another object of the invention is provide a novel and improved distance detecting apparatus for a vehicle which is able to concurrently detect the distances to a plurality of objects which exist within the field of view of the driver, and in which the driver is able to readily and accurately recognize to which objects the distances are detected.

A further object of the invention is to provide a novel and improved distance detecting apparatus for a vehicle which is able to sense a preceding vehicle running ahead of a subject vehicle on which the apparatus is mounted without dazzling the passengers in the preceding vehicle even when travelling in a tunnel or in dark weather such as in the evening, twilight and the like.

In order to achieve the above objects, according to the present invention, there is provided a distance detecting apparatus for a vehicle comprising: a pair of first and second image sensors including a pair of optical systems for optically sensing a plurality of objects; a first memory for storing the images of the objects sensed by the first image sensor as first image signals; a second memory for storing the images of the objects sensed by the second image sensor as second image signals; a display with a screen for displaying the images of the objects as sensed by the image sensors on the screen; window defining means for defining a plurality of windows at specific locations on the screen of the display; distance calculating means for electrically detecting deviations between the images of the objects within the respective windows as sensed by the image sensors and individually calculating the distance to each object in each window based on the calculated deviations; and obstacle discriminating means for discriminating, among the objects around the vehicle as sensed by the image sensors, obstacles to the travel of the vehicle on the basis of the positions of the windows on the screen and the distances to the objects in the respective windows as detected.

The window defining means defines the plurality of windows in such a manner that the windows are disposed on the screen of the display in a horizontally separate relation with respect of each other, the windows including a central window located at the center of the screen, and a plurality of side windows located on the opposite sides of the central window. The obstacle discriminating means determines that the image in the central window is the image of a preceding vehicle which a vehicle having the apparatus installed thereon follows.

Preferably, the apparatus further comprises means for determining, based on the rate of change of the distances as measured by the distance calculating means, whether an object displayed in each window is coming near or going away from a vehicle on which the apparatus is installed.

Preferably, a vehicle condition sensing means is provided for determining whether a subject vehicle having the apparatus installed thereon is travelling on a curved road. The obstacle discriminating means operates to determine that the objects displayed in the windows are not obstacles impeding the travel of the subject vehicle, if it is determined that the subject vehicle is travelling on a curved road and if the distances to the objects displayed in the windows vary in a gradually decreasing or increasing manner in a horizontal direction from one side to the other side of the windows.

An infrared light generating means can be provided for projecting a beam of infrared light toward objects present within the fields of view of the image sensors when natural visible light is insufficient for the image sensors. In this case, the image sensors are sensitive to infrared light as well.

The above and other objects, features and advantages of the invention will become more readily apparent from the detailed description of a few preferred embodiments of the invention taken in conjunction with the accompanying drawings.

BRIEF DESCRIPTION OF THE DRAWINGS

In the figures, the same or corresponding parts are identified by the same symbols.

DESCRIPTION OF THE PREFERRED EMBODIMENTS

A few preferred embodiments of the present invention will now be described in detail with reference to the accompanying drawings.

Figure 1:
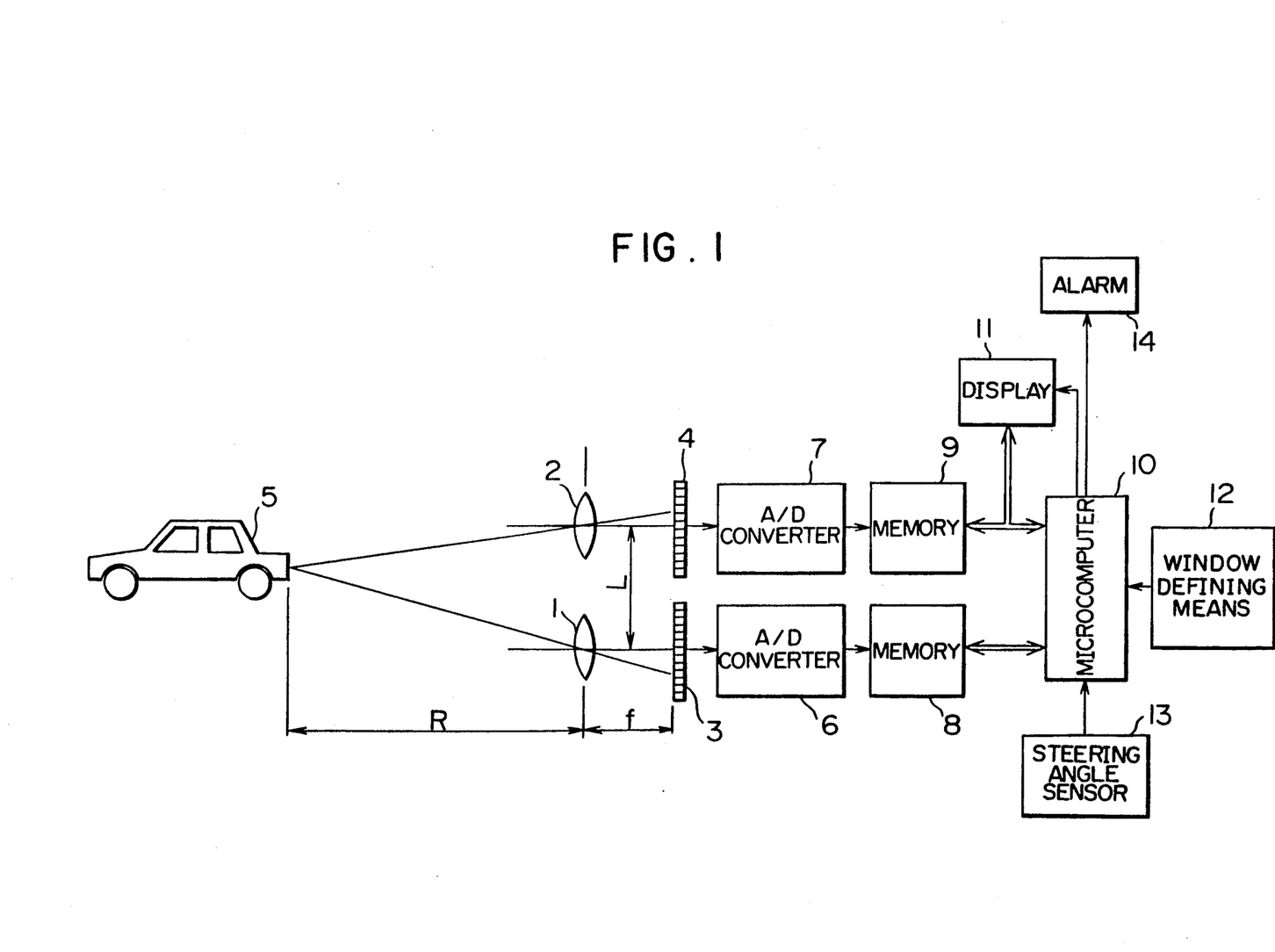
FIG. 1 is a schematic block diagram showing the general arrangement of a distance detecting apparatus for a vehicle in accordance with the present invention.

FIG. 1 illustrates, in a block diagram, the schematic arrangement of a distance detecting apparatus which is constructed in accordance with the principles of the invention and which is mounted on a vehicle for detecting the distances to objects such as preceding vehicles, obstacles and the like lying ahead of the subject vehicle.

Figure 2:
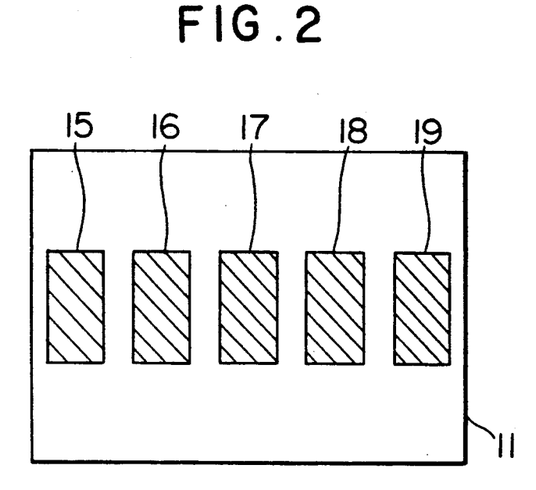
FIG. 2 is an explanatory view showing a plurality of windows defined on the screen of a display.

The apparatus illustrated includes a pair of first and second parallel optical systems having two convex lenses 1, 2 disposed in a vertically aligned relation at a prescribed distance L away from each other, and a pair of separate first and second (e.g., upper and lower) image sensors 3, 4 which are vertically or otherwise disposed at focal points of the lenses 1, 2, respectively, at a distance f from the locations of the corresponding lenses 1, 2 for generating first and second image signals in the form of analog signals representative of a two-dimensional image, which are input to a pair of corresponding first and second analog-to-digital (A/D) converters 6, 7. The outputs of the A/D converters 6, 7 are input to a pair of corresponding first and second memories 8, 9 and stored therein. A microcomputer 10, which acts as a distance calculating means and an obstacle discriminating means of the invention, performs data transfer with the memories 8, 9 so that it makes various calculations and determinations based on the data stored in the memories 8, 9. A display 11 having a screen is connected to the first and second memories 8, 9 and the microcomputer 10 for displaying the images of objects sensed by the first or second image sensor 3, 4 on the screen. The operation of the display 11 is controlled by the microcomputer 10. A window defining means 12 is connected to the microcomputer 10 for defining on the screen of the display 11 a plurality of windows which can be utilized for designating a plurality of objects for distance measurements. More specifically, as shown in FIG. 2, the driver of a vehicle can manipulate the window defining means 12 to define a plurality (e.g., five in the illustrated embodiment) of windows 15 through 19 on the screen of the display 11 at horizontally spaced or separate predetermined locations thereof while looking at the screen. A vehicle condition sensing means 13 in the form of a steering angle sensor senses the amount or angle of steering representative of the rotational angle of a steering wheel of the vehicle and generates a corresponding steering angle signal to the microcomputer 10. An alarm 14 in the form of a buzzer is actuated by the microcomputer 10 to generate a warning when the distance to an object 5 such as a preceding vehicle decreases to a predetermined level.

Figure 3:
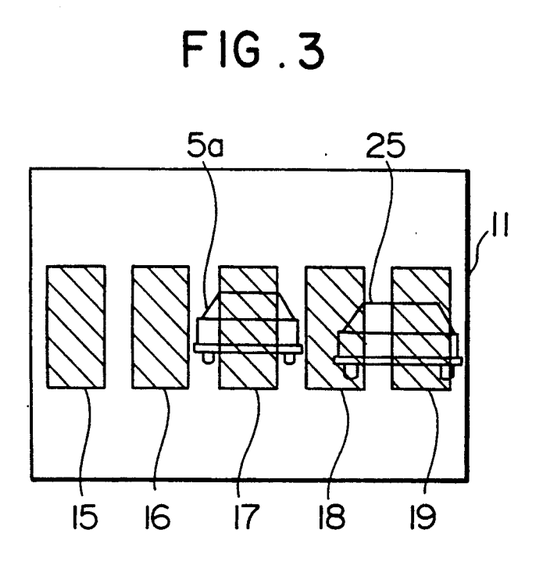
FIG. 3 is an explanatory view showing that a plurality of preceding vehicles running ahead of a vehicle come into some of the windows.

The operation of the above embodiment will be described below while referring to FIGS. 2, 3 and 4(a) and 4(b). First, assume that an object in the form of a preceding vehicle 5 lying ahead of the subject vehicle is sensed by the second or upper image sensor 4, digitized by the second A/D converter 7, stored in the second memory 9, and then displayed on the screen of the display 11, as shown in FIG. 3. In this case, the microcomputer 10 reads out from the second memory 9 picture element signals within the central window 17 that catches the preceding vehicle 5, and takes them as reference image signals, which are used as a basis for calculating the distance to the preceding vehicle 5. Then, the microcomputer 10 selects a specific area corresponding to the window 17 from the first memory 8, which stores image signals of objects sensed by the first or lower image sensor 3. Then, the microcomputer 10 calculates a total sum of the absolute values of the differences or deviations between the corresponding image signals for the first and second picture elements stored in the first and second memories 8, 9 while vertically shifting the image signals from the first memory 8 relative to the above defined reference image signals in a stepwise manner one picture element by one picture element. In other words, by sequentially shifting the second memory image signals one picture element by one picture element, the best position of the image of the object in the first memory 8 is determined in which the image in the first memory 8 best matches the reference image. Thus, the amount of shift or shift distance of the second memory image 5a relative to the reference image is calculated which minimizes the total sum of the absolute values of the deviations.

Figure 4A:
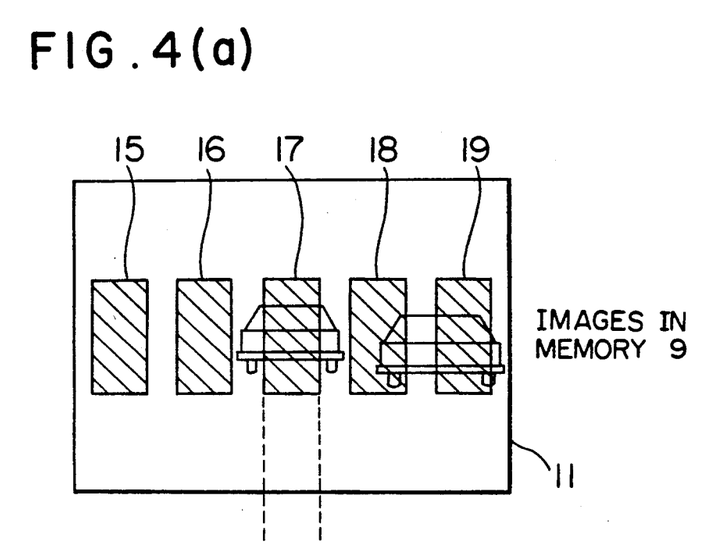
FIGS. 4(a) and 4(b) are explanatory views showing image areas to be compared with reference images each within a corresponding window.
Figure 4B:
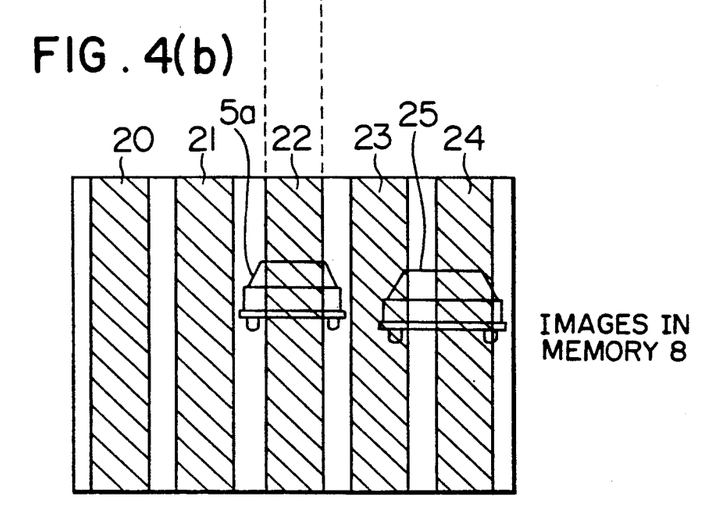

In this connection, it is to be noted that the area in the first memory 8 relating to the above calculation is a vertically extending band area 22, as shown in FIG. 4(b), which corresponds to the position of the window 17 in which the reference image exists, as shown in FIG. 4(a).

Using the amount of shift n in terms of the number of picture elements as calculated above, the distance R to the preceding vehicle 5 is calculated as follows:

$$R = (f \times L)/nP \quad (1)$$

where f is the focal distance of the first and second lenses 1, 2; L is the distance between the centers of the first and second lenses 1, 2; n is the amount of shift represented by the number of picture elements for minimizing the total sum of the absolute values of the deviations between the first and second picture elements in the first and second memories 8, 9; and P is the vertical pitch between adjacent picture elements in a vertical array.

In this manner, the distance R to the object 5 imaged in the window 17 can be measured. Likewise, if another vehicle 25 running on an adjacent lane of the road ahead of the subject vehicle comes into the fields of view of the image sensors 3, 4 and is displayed on the screen of the display 11 inside the window 19, as illustrated in FIG. 3, the microcomputer 10 takes the image signals inside a window 19 as reference picture signals as shown in FIG. 4(a), selects an image area 24 in the first memory 8 corresponding to the image signals of the second memory 9 inside the window 19, and determines the position of the image of the vehicle 25 in the first memory 8 which provides the best match with the image inside the window 19. Then, using equation (1) above, the distance to the other vehicle 25 is calculated in the same manner.

In this manner, even in cases where there are a plurality of preceding vehicles running ahead of the subject vehicle, it is possible to concurrently detect the distances to the respective preceding vehicles.

As can be seen from the foregoing, the objects caught in the plurality of windows 15 through 19 defined on the screen of the display 11, as shown in FIG. 4(a), are compared with the images thereof in the calculation areas of the memory 8 corresponding to the windows 20 through 24, respectively, as shown in FIG. 4(b), whereby the distances to the respective objects can substantially concurrently be measured using the individual windows 15 through 19.

Further, if it is detected from the output signal of the steering angle sensor 13 that the subject vehicle is running straight, it is determined that the vehicle displayed on the screen 11 in the center thereof is a preceding vehicle travelling on the same lane of a road as that on which the subject vehicle is travelling. Accordingly, if the distance from the subject vehicle to the preceding vehicle becomes short or decreases to a predetermined level, the microcomputer 10 actuates the alarm 14, warning the driver of the presence of an obstacle in the form of the preceding vehicle lying ahead of the subject vehicle.

Figure 5:
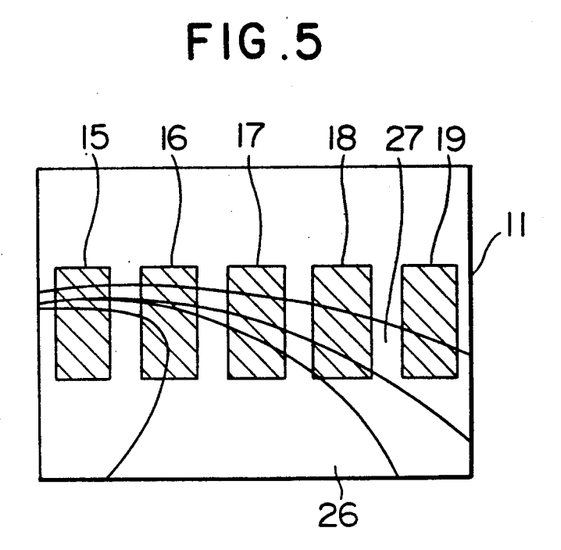
FIG. 5 is an explanatory view showing images displayed on the screen when the vehicle is travelling on a curved road.

On the other hand, when the subject vehicle is travelling on a curved road 26, e.g., a left-hand curve, the image of a guide rail 27, which lies ahead of the vehicle and is set up on one side or shoulder of the road 26, is displayed on the screen 11. In this case, too, the distances to the respective portions of the guide rail 27 caught in the respective windows 15 through 19 are detected or measured in the same manner as in the case of the preceding vehicle. On this occasion, the distances as detected by the right-side windows 18, 19 lying to the right of the central window 17 in the center of the screen 11 are shorter than that detected by the central window 17, whereas the distances as detected by the left-side windows 15, 16 are longer than that detected by the central window 17. Accordingly, if such information is obtained during the time when the steering angle sensor 13 senses a left-hand steering operation of the driver, the microcomputer 10 determines that an object caught in the central window 17 on the screen 11 is not an obstacle impeding the travel of the vehicle. As a result, even if the distance detected by the central window 17 is short, it is determined that there is no problem, and hence the alarm 14 is not actuated. In this manner, on the basis of the information on the distances to objects ahead of the subject vehicle as detected by the respective windows 15 through 19, it can be precisely determined whether the objects as detected and displayed by the respective windows 15 through 19 are true obstacles to the travel of the subject vehicle.

Figure 6:
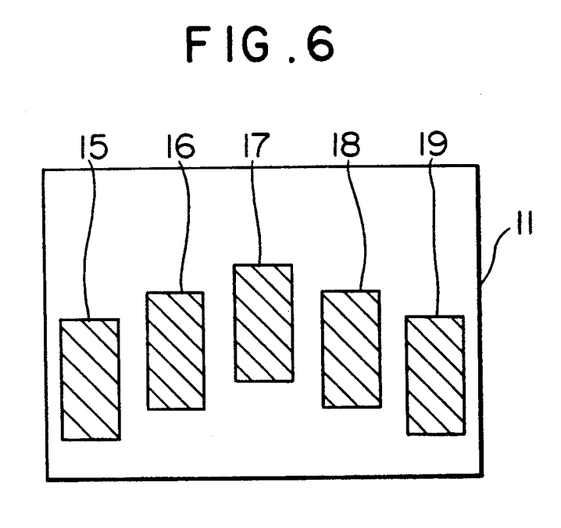
FIG. 6 is a view showing that the positions of windows on the screen are altered.

Although in the above embodiment, five windows 15 through 19 are set on the screen, the number of such windows can be arbitrarily selected depending on the dimensions of objects within the fields of view of the image sensors 3, 4, the number of objects to which distance measurements are required, etc. Also, the size and configuration of each window can be arbitrarily changed according to an object to be detected. In addition, the positions of windows as set on the screen 11 can be varied according to ranges or fields to be detected, as shown in FIG. 6. Moreover, the present invention can be applied for detecting or supervising objects present in the rear vision of a vehicle. Further, according to the invention, it is possible to calculate the rate of change of the distance to an object caught by each of the windows 15 through 19 so as to determine whether or not the object is coming near or going away from the subject vehicle.

In addition, although in the above embodiment, the lenses 1, 2 and the image sensors 3, 4 are disposed in a vertically aligned and spaced relationship with respect to each other, they may be disposed in a modified manner, e.g., diagonally on a vertical plane, such that they are disposed substantially vertically. Obviously, such a modified arrangement provides substantially the same results.

Figure 7:
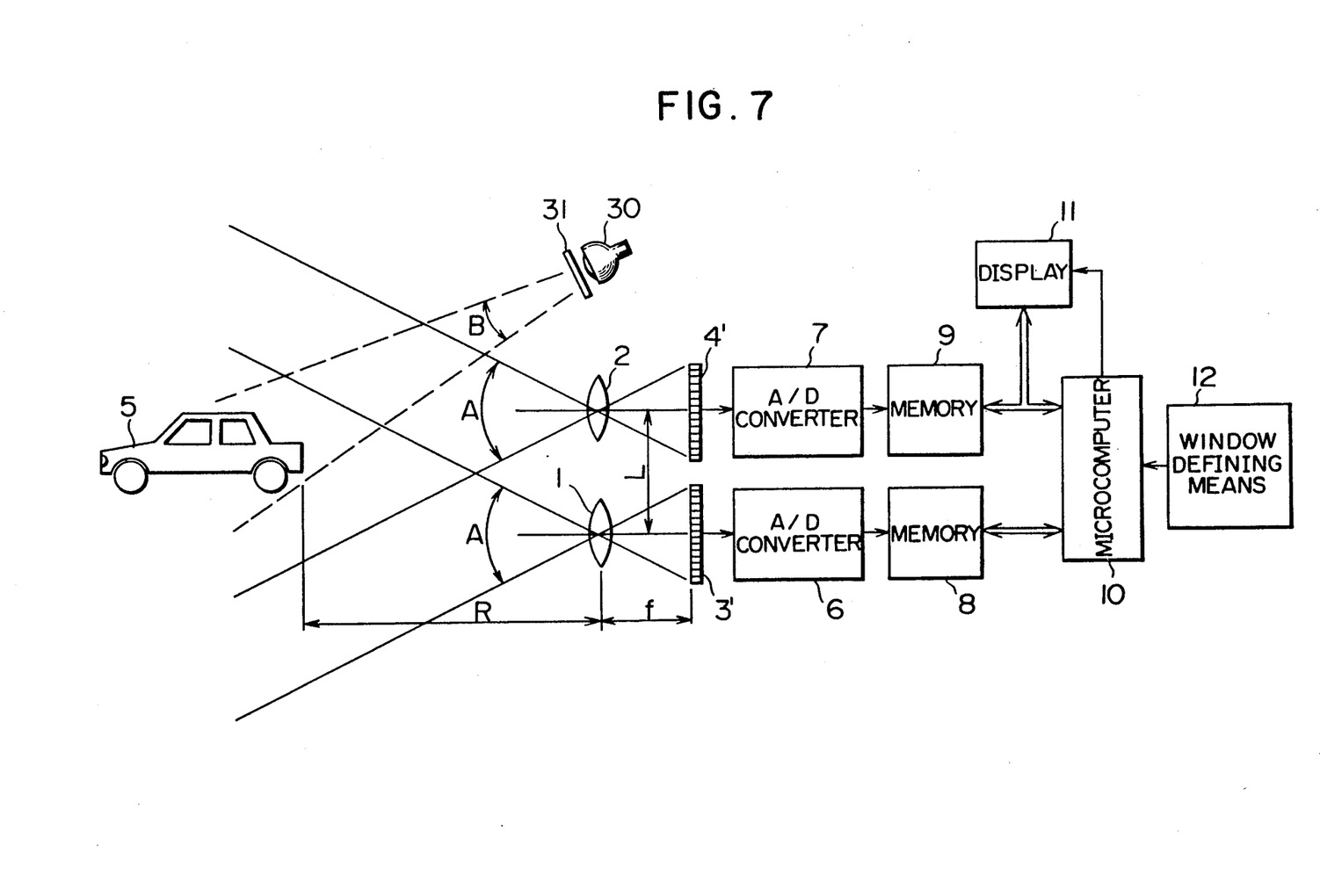
FIG. 7 is a view similar to FIG. 1, but showing another embodiment of the invention.

FIG. 7 shows another embodiment of the invention. This embodiment is substantially similar to the previous embodiment of FIG. 1 except for the following. An infrared light generating means is provided for projecting a beam of infrared light to objects for detecting them in dark weather in which there is insufficient natural visible light. The infrared light generating means comprises a light generator 30 in the form of a halogen lamp for generating a beam of light including visible light components and infrared light components, and an infrared light filter 31 for filtering or removing almost all of the visible light components from the light generated by the light generator while passing infrared light components alone. The infrared light beam projected from the light generator 30 through the filter 31 to an object 5 is reflected from a surface thereof and received by a pair of first and second image sensors 3', 4' through respective lenses 1, 2. The image sensors 3', 4' are sensitive to infrared light as well as visible light. Like the previous embodiment, the images of the object 5 thus sensed by the image sensors 3', 4' are stored in corresponding memories 8, 9 and then processed by a microcomputer 10 in the same manner as in the previous embodiment. The image of the object 5 sensed by the second image sensor 4' is displayed on the screen of a display 11 within a plurality of windows which are appropriately set thereon in advance. In this connection, the light generator 30 projects a light beam toward the object 5 with an angle of projection B which is set to be less than the angle of field A of the image sensors 3', 4' through the lenses 1, 2, as shown in FIG. 7, such that the infrared light reflected from the object 5 can be received by the image sensors 3', 4'. More specifically, the light beam is projected to those areas of objects which can be sensed by the image sensors 3', 4' and displayed within the plurality of windows preset on the screen 11.

In this embodiment, the steering angle sensor 13 and the alarm 14 as employed with the previous embodiment of FIG. 1 are omitted but may be provided as necessary.

The operation of the second embodiment is substantially similar to that of the first embodiment in cases where sufficient natural light is available such as during day time. In dark weather such as in the evening, twilight and the like in which natural light is limited and insufficient for the image sensors, however, the light generator 31 is energized to generate a beam of light which is filtered by the infrared light filter 31 so that infrared light components alone are passed onto an object 5 such as a preceding vehicle. The infrared light reflected from a surface of the object 5 is sensed by the first and second image sensors 3', 4'. The images of the object 5 thus sensed are converted by the A/D converters 6, 7 from analog into digital form and stored in the first and second memories 8, 9. The microcomputer 10 fetches picture element signals from the memories 8, 9 and processes them and displays the image of the object 5 as sensed by the second image sensor 4' on the screen of the display 11 in the same manner as in the previous embodiment. Thus, according to this embodiment, the objects present in the dark can be detected and the distances thereto can be precisely measured in the same manner as in bright weather. In this regard, the projection of infrared light including little or no visible light components does not cause any dazzling or blinding of the driver or passengers in the preceding vehicle 5, so the driver in the preceding vehicle can maneuver his or her vehicle without any resultant trouble or inconvenience.

Although in the above description, the infrared light generating means comprises a combination of the light generator 30 and the infrared light filter 31, it is not limited to such an arrangement but may take any other appropriate form which can generate a beam of infrared light while excluding almost all of the visible light components.

What is claimed is:

1. A vehicle mounted distance detecting apparatus, comprising:
   a) a pair of laterally spaced first and second image sensors (3,4; 3'4') including a pair of optical systems (1, 2) for optically sensing a plurality of objects;
   b) a first memory for storing the images of said objects sensed by said first image sensor as first image signals;
   c) a second memory for storing the images of said objects sensed by said second image sensor as second image signals;
   d) a display (11) with a screen for displaying the images of said objects as sensed by said image sensors on the screen;
   e) window defining means (12) for defining a plurality of windows (15-19) at specific locations on the screen of said display;
   f) distance calculating means for electrically detecting deviations between the images of said objects within the respective windows as sensed by said image sensors and individually calculating the distance to each object in each window based on the calculated deviations; and
   g) obstacle discriminating means for discriminating, among the objects around the vehicle as sensed by said image sensors, obstacles to the travel of the vehicle on the basis of the positions of the windows on the screen and the calculated distances to the objects in said respective windows.

2. A distance detecting apparatus according to claim 1, wherein said window defining means defines the plurality of windows in such a manner that the windows are disposed on the screen of said display in a horizontally separate relation with respect to each other, said windows including a central window (17) is located at the center of the screen, and a plurality of side windows (15, 16, 18, 19) located on the opposite sides of said central window; and
   said obstacle discriminating means determines that the image in the central window is the image of a preceding vehicle which a vehicle having the distance detecting apparatus installed thereon follows.

3. A distance detecting apparatus according to claim 1, further comprising means for determining, based on the rate of change of the distances as measured by said distance calculating means, whether an object displayed in each window is coming nearer to or going away from a vehicle on which the distance detecting apparatus is installed.

4. A distance detecting apparatus according to claim 1, further comprising vehicle condition sensing means (13) for sensing whether a subject vehicle having the distance detecting apparatus installed thereon is travelling on a curved road, and wherein said obstacle discriminating means is operable to determine that objects displayed in the windows are not obstacles impeding the travel of the subject vehicle, if it is determined that the subject vehicle is travelling on a curved road and if the distances to the object displayed in the windows vary in a gradually decreasing or increasing manner in a horizontal direction from one side to the other side of the windows.

5. A distance detecting apparatus according to claim 4, wherein said vehicle condition sensing means comprises a steering angle sensor for sensing the rotational angle of a steering wheel of the subject vehicle and generating a corresponding output signal, said obstacle discriminating means being operable to determine, based on the output signal from said steering angle sensor, that the subject vehicle is travelling on a curved road, if the rotational angle of the steering wheel exceeds a predetermined value.

6. A distance detecting apparatus according to claim 1, further comprising infrared light generating means for projecting a beam of infrared light toward objects present within the fields of view of said image sensors when natural visible light is insufficient for said image sensors, and wherein said image sensors are sensitive to infrared light.

7. A distance detecting apparatus according to claim 6, wherein said infrared light generating means comprises:
   a light generator (30) for generating light including visible light components and infrared light components; and
   an infrared light filter (31) for removing most of visible light components from the light generated by said light generator while permitting infrared light components to pass.

8. A distance detecting apparatus according to claim 7, wherein said light generator comprises a halogen lamp.

* * * * *